US010701861B2

(12) United States Patent
Gould et al.

(10) Patent No.: US 10,701,861 B2
(45) Date of Patent: Jul. 7, 2020

(54) MODULAR SENSOR ARRAY FOR BULK MATERIAL DETECTION

(71) Applicant: CNH Industrial America LLC, New Holland, PA (US)

(72) Inventors: Matthew Gould, Dover, MA (US); Cory Hunt, Conestoga, PA (US); Bart M. A. Missotten, Herent (BE); John H. Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 165 days.

(21) Appl. No.: 16/039,638

(22) Filed: Jul. 19, 2018

(65) Prior Publication Data
US 2020/0022305 A1 Jan. 23, 2020

(51) Int. Cl.
A01D 41/00 (2006.01)
A01D 41/127 (2006.01)
A01D 41/12 (2006.01)

(52) U.S. Cl.
CPC ..... A01D 41/1275 (2013.01); A01D 41/1208 (2013.01)

(58) Field of Classification Search
CPC ............ A01D 41/1275; A01D 41/1208; A01D 41/127; A01D 41/1272; A01D 41/1274; A01D 41/1277; G01F 17/00; G01F 23/14
USPC ........ 56/10.2 R; 222/56, 64; 460/1, 4–6, 16, 460/114, 119, 150
See application file for complete search history.

(56) References Cited

U.S. PATENT DOCUMENTS

| 4,527,714 | A | * | 7/1985 | Bowman | G01F 23/14 222/56 |
| 5,480,354 | A | | 1/1996 | Sadjadi | |
| 5,529,537 | A | * | 6/1996 | Johnson | A01D 41/1275 460/119 |
| 7,877,181 | B2 | * | 1/2011 | Chervenka | A01D 41/1275 460/119 |
| 8,981,949 | B2 | * | 3/2015 | Ricketts | A01D 41/1275 340/540 |
| 9,551,737 | B2 | | 1/2017 | Bloemendaal et al. | |

(Continued)

FOREIGN PATENT DOCUMENTS

EP 2359674 A1 8/2011
EP 2765398 A1 8/2014

(Continued)

OTHER PUBLICATIONS

Extended European Search Report for EP Application No. 19186845.4 dated Dec. 13, 2019 (six pages).

Primary Examiner — Robert E Pezzuto
(74) Attorney, Agent, or Firm — Peter Zacharias; Patrick Sheldrake

(57) ABSTRACT

A combine having a feeder housing for receiving harvested crop, a separating system for threshing the harvested crop to separate grain from residue, a grain tank for storing the separated grain, a grain tank level sensor for detecting a level of grain in the grain tank, and a controller that controls the combine. The controller is configured to receive the level of grain from the grain tank level sensors, determine a volume of a grain base from the level of the grain, determine a volume of a grain heap above the grain base, determine a total volume by combining the volume of the grain base with the volume of the grain heap.

20 Claims, 17 Drawing Sheets

(56) References Cited

U.S. PATENT DOCUMENTS

| | | | |
|---|---|---|---|
| 9,949,435 B2 * | 4/2018 | Banks, Jr. | A01D 41/1226 |
| 10,231,381 B2 * | 3/2019 | Holt, II | A01D 41/1275 |
| 2016/0029559 A1 | 2/2016 | Inoue et al. | |
| 2017/0208742 A1 | 7/2017 | Ingibergsson et al. | |

FOREIGN PATENT DOCUMENTS

| | | |
|---|---|---|
| JP | 2005087078 A | 4/2005 |
| WO | 2014146152 A1 | 9/2014 |
| WO | 2015052563 A1 | 4/2015 |
| WO | 2017/187249 A1 | 11/2017 |
| WO | 2017/187250 A1 | 11/2017 |

* cited by examiner

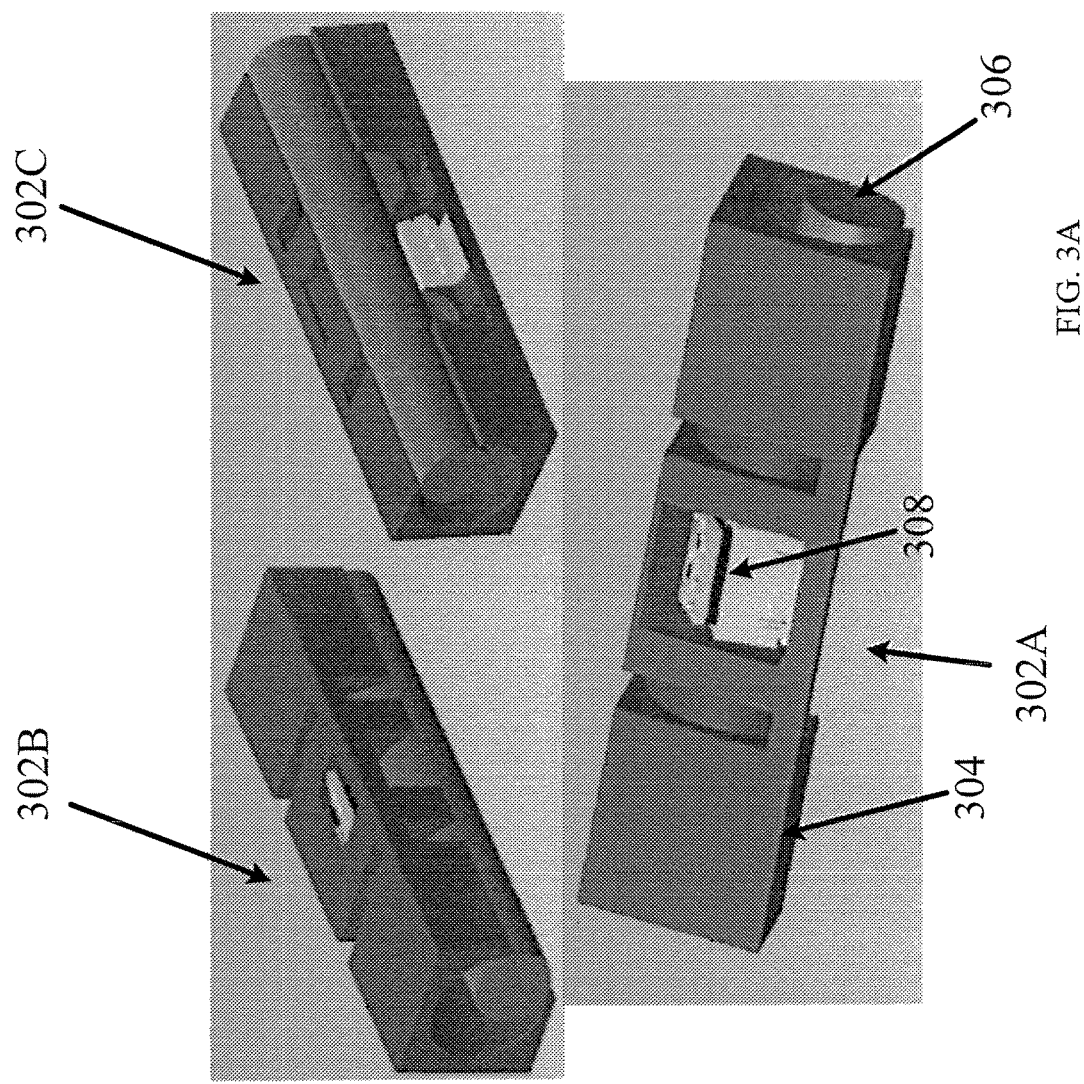
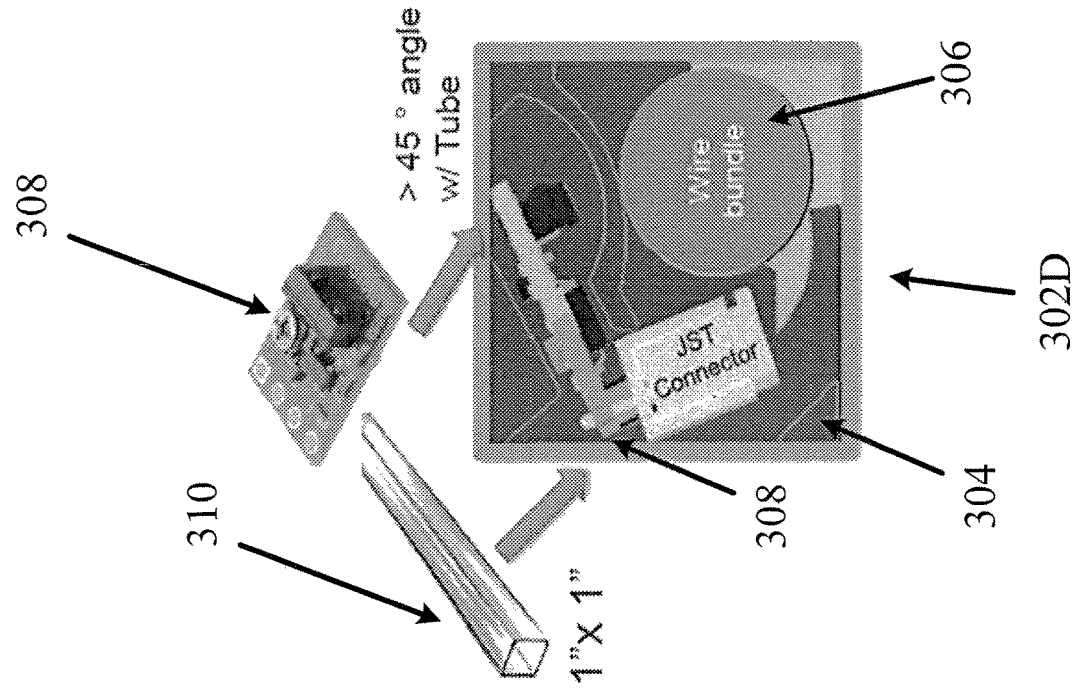
FIG. 3A

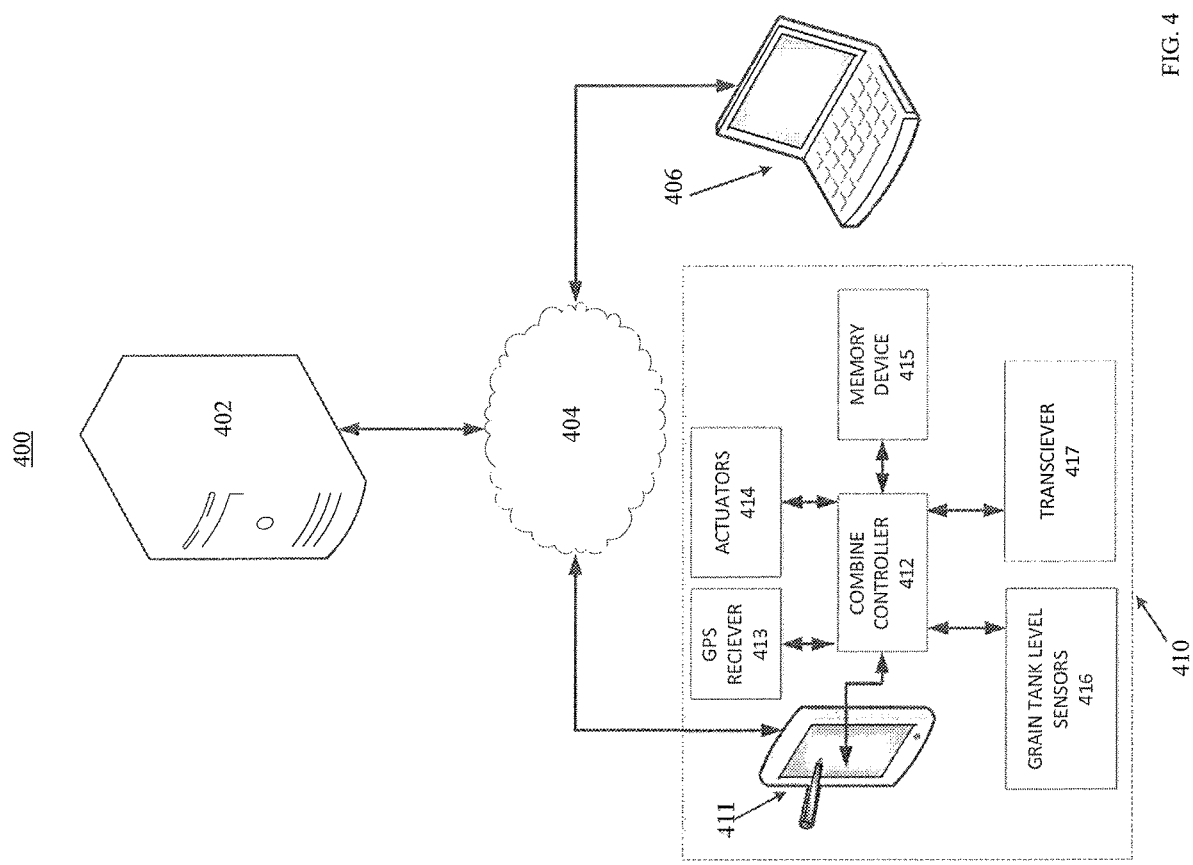

MODULAR SENSOR ARRAY FOR BULK MATERIAL DETECTION

FIELD

The disclosure relates to grain tank measurement system and method for estimating grain volume in a grain tank of a combine.

BACKGROUND

Harvesters (e.g. combines) are used to harvest crops. Operations performed by conventional combines include chopping the crop and collecting grain in a grain tank. These conventional combines, however, utilize grain quantity measurement devices and methods that are susceptible to grain measurement inaccuracies and grain spillage.

SUMMARY

An embodiment includes a combine having a feeder housing for receiving harvested crop, a separating system for threshing the harvested crop to separate grain from residue, a grain tank for storing the separated grain, a grain tank level sensor for detecting a level of grain in the grain tank, and a controller that controls the combine. The controller is configured to receive the level of grain from the grain tank level sensor, determine a volume of a grain base from the level of the grain, determine a volume of a grain heap above the grain base, and determine a total volume by combining the volume of the grain base with the volume of the grain heap.

An embodiment includes a method for controlling a combine having a chassis, a feeder housing for receiving harvested crop, a separating system for threshing the harvested crop to separate grain from residue, a grain tank for storing the separated grain, a grain tank level sensor for detecting a level of grain in the grain tank, and a controller that controls the combine. The method includes the steps of receiving, by the controller, the level of grain from the grain tank level sensor, determining, by the controller, a volume of a grain base from the level of the grain, determining, by the controller, a volume of a grain heap above the grain base, determining, by the controller, a total volume by combining the volume of the grain base with the volume of the grain heap.

BRIEF DESCRIPTION OF THE FIGURES

FIG. 3A shows multiple views of the grain tank level sensors, according to an embodiment of the disclosure.

FIG. 4 is a view of the communication between the combine control system and an external network, according to an embodiment of the disclosure.

DETAILED DESCRIPTION

Aspects of the disclosure provide methods and systems for operator adjustable tank level measurement for implementation in a harvester combine.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG).

Figure 1A:
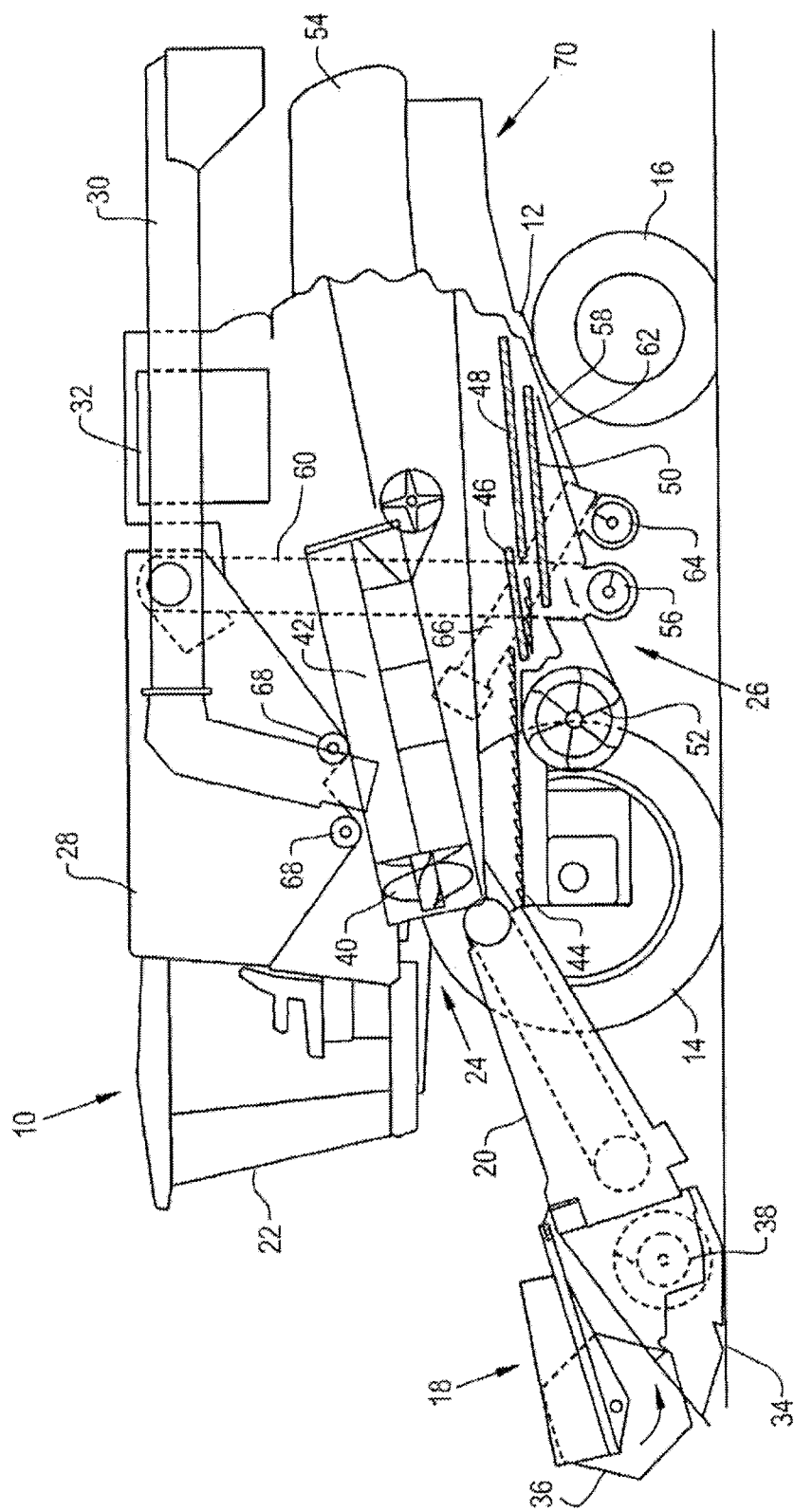
FIG. 1A is a side view of a combine, according to an embodiment of the disclosure.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged grain elevator 60 for transport to grain tank 28.

Tailings from cleaning system 26 fall to a tailings auger trough 64. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a windrow door and a residue spreader. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

A controller (not shown in FIG. 1A) measures the collected grain to determine if the grain tank 28 is full. The controller measures the grain with the aid of grain level sensors located within grain tank 28. In one example, shown in FIG. 1B, a first grain tank level sensor array 100 and a second grain tank level sensor array 102 are located along the interior walls of grain tank 28. A third grain tank level sensor array 101 and a fourth grain tank level sensor array 103 (e.g. center arrays) are located in the center of grain tank 28 and extend from the base of the grain tank away from the tank walls towards the center of the grain tank. Grain tank level sensor arrays 100, 101, 102 and 103 may include an array of acoustic sensors, pressure sensors, optical sensors, and/or the like that detect the presence of grain in the tank in a local region surrounding the sensor.

Figure 1B:
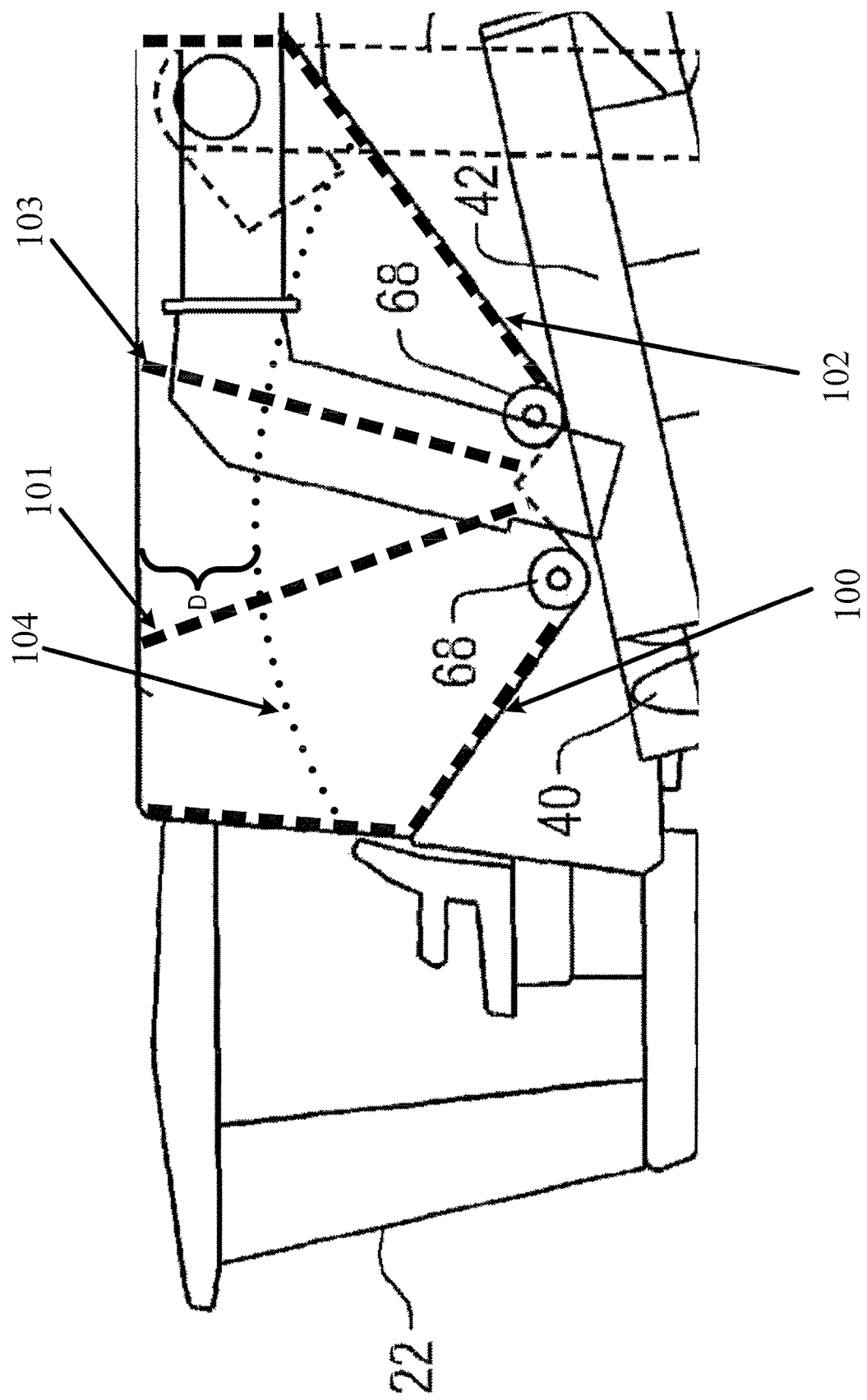
FIG. 1B is a close-up view of the grain tank level sensors on a combine, according to an embodiment of the disclosure.

Grain tank level sensor arrays 100-103 in FIG. 1B extend from a bottom portion of the grain tank to a top portion of the tank. Grain tank level sensor arrays 100-103 may include optical sensors such as infrared (IR) sensors that transmit an IR beam of light. If grain fills the tank and covers an IR sensor, the IR light reflects back to the IR receiver, thereby triggering the sensor. A controller receives a trigger signal from the sensor and determines the level of grain in the tank based on the known location of the sensor within the tank. For example, when grain pile 104 is present in the tank, the $1^{st}$-$9^{th}$ sensors in arrays 100 and 102 trigger, and the $1^{st}$-$8^{th}$ sensors in arrays 101 and 103 trigger. These triggered sensors correspond to a predetermined level (e.g. 75%) of grain within the tank. In this example, when the grain triggers the sensors, the controller determines that the grain heap surface is located at the location of the $9^{th}$ sensor. Notifications such as a display of the tank level, tank volume, or a trigger of an alarm are output to the operator.

The shape of the grain pile within the tank depends on various factors including the slope of the ground that the combine is traveling on. Having multiple arrays of sensors at multiple locations within the tank provides a system that is able to more accurately detect grain level when the grain pile is not uniform. For example, as shown in FIG. 1B, on level ground, the detected levels between arrays are generally similar (e.g. sensors 100 and 102 both show 75% full) due to a uniform grain pile in the tank. However, when the combine is harvesting on a slope or a hill, and leaning forward, backward, to the left, or to the right, the levels detected by sensor arrays 100 and 102 may not coincide due to the slope of a non-uniform grain pile in the tank (e.g. if the combine is harvesting downhill, sensors 100 may detect 75% and sensors 102 may detect only 50%). This discrepancy is important to detect, because the side of the tank with the highest grain level is more likely to overflow and spill out of the top of the grain tank. Such spillage results in lost revenue.

Figure 2A:
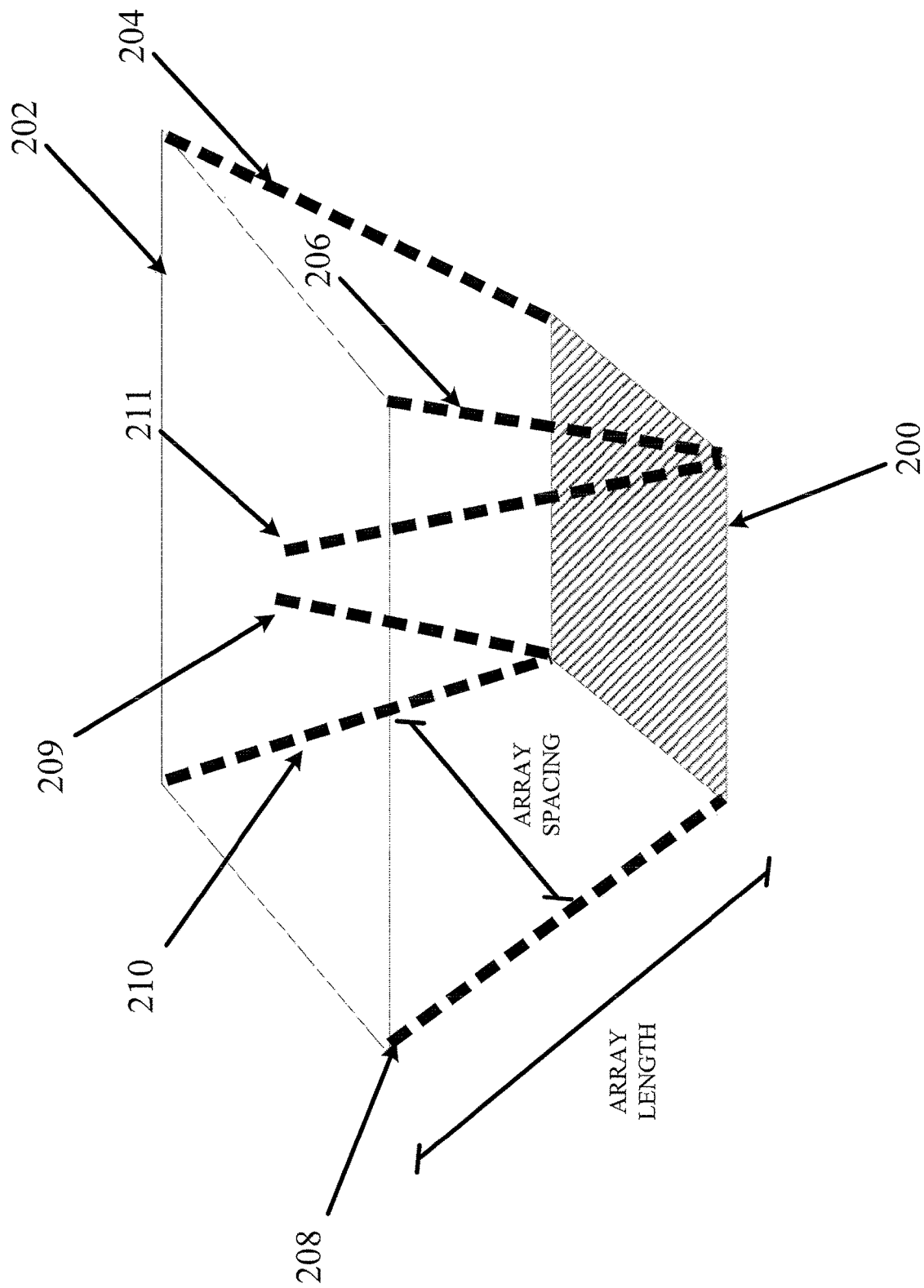
FIG. 2A is a perspective view of the grain tank of the combine, according to an embodiment of the disclosure.

In order to more accurately measure grain tank level, and avoid spillage, the combine includes multiple arrays (e.g. 3 or more) of sensors at various locations within the grain tank (e.g. one center array in the middle of the tank and two side arrays along the tank wall). FIG. 2A shows a 3-dimensional view of an example of such a grain tank configuration. Specifically, the grain tank in this example has a 3-dimensional trapezoid-like shape extending from base 200 to top rim 202. The grain tank includes four side arrays of level sensors 204, 206, 208 and 210 positioned in the corners of the tank separated by an array spacing and extending along an array length from base 200 to top rim 202. These sensor arrays are similar to the sensor arrays 100 and 102 shown in FIG. 1B. The grain tank also includes two center arrays of level sensors 209 and 211 positioned extending along an array length from base 200 at an angle towards the center of top rim 202. These sensor arrays are similar to the sensor arrays 101 and 103 shown in FIG. 1B.

The four sensor arrays in FIG. 2A provide the ability to detect six grain level points at six different locations within the tank. In this example, these arrays each have 12 sensors, which provide each array with a resolution of 12 detectable grain levels. In general, the accuracy of the system increases as the number of arrays and number of sensors within each array are increased. Thus, the number of arrays, the number of sensors within each array, and the locations of the arrays within the tank are configurable to achieve the desired accuracy.

Figure 2B:
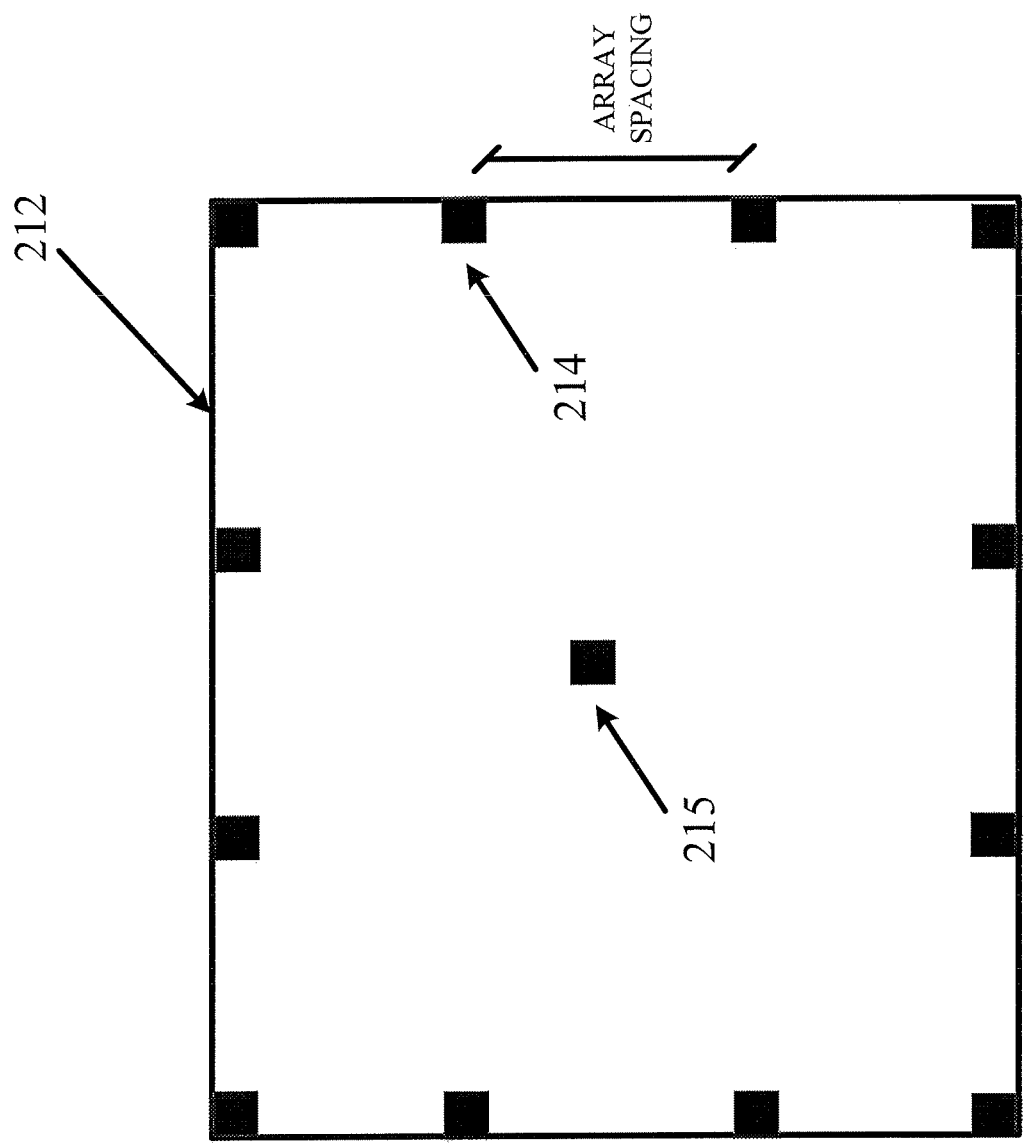
FIG. 2B is a top view of the grain tank of the combine, according to an embodiment of the disclosure.

For example, FIG. 2B shows a top view of tank 212 (i.e., looking down on the top of the tank) that includes 12 side sensor arrays 214 positioned from each other by a set array spacing around the inner wall of the tank and one center sensor array 215 positioned in the center of the tank. This configuration provides 13 data points of grain tank levels around the entire perimeter and the center of the tank. Assuming each array includes 10 sensors, each array would be able to detect the tank fill level at 10 discrete levels. The spacing of the array may be equidistant, or may follow other spacing patterns. In addition, the sensor arrays can extend along a partial height of the grain tank, and may not necessarily be vertical (i.e., they could be diagonal) or may not be directly in the center of the tank. In some examples, the arrays may be curved (e.g. curved to follow the tank geometry), and segmented (e.g. positioned in portions of the tank). In general, any mathematically describable array configuration can be used to detect the grain.

FIG. 3A shows multiple views of optical IR grain tank sensors used within the arrays. Each sensor includes a housing 304 (e.g., plastic), an electrical circuit 308 for driving the sensor components and communicating with the controller, and a channel that allows a wire bundle 306 to pass through. Views 302A, 302B and 302C show various perspective views of the same sensor, while view 302D shows a side view of the sensor. An isolated view of electronic circuit 308 is also shown. In one example, electronic circuit 308 may include an IR transmitter, an IR receiver, and a driver circuit that drives the IR transmitter as well as transmit/receive information to/from a controller (not shown). In this example, the sensors within the array may also be housed in a cube-like sleeve 310 made from transparent material (e.g., clear plastic) which aligns the sensors in a package that is easily mountable within the grain tank, as well as protects the sensors from damage due to the grain and other external factors. In other examples, other types of sensors may be used in place of or in combination with the IR sensors. These other sensors include but are not limited to acoustic sensors, laser sensors, radio frequency sensors and pressure sensors.

Figure 3B:
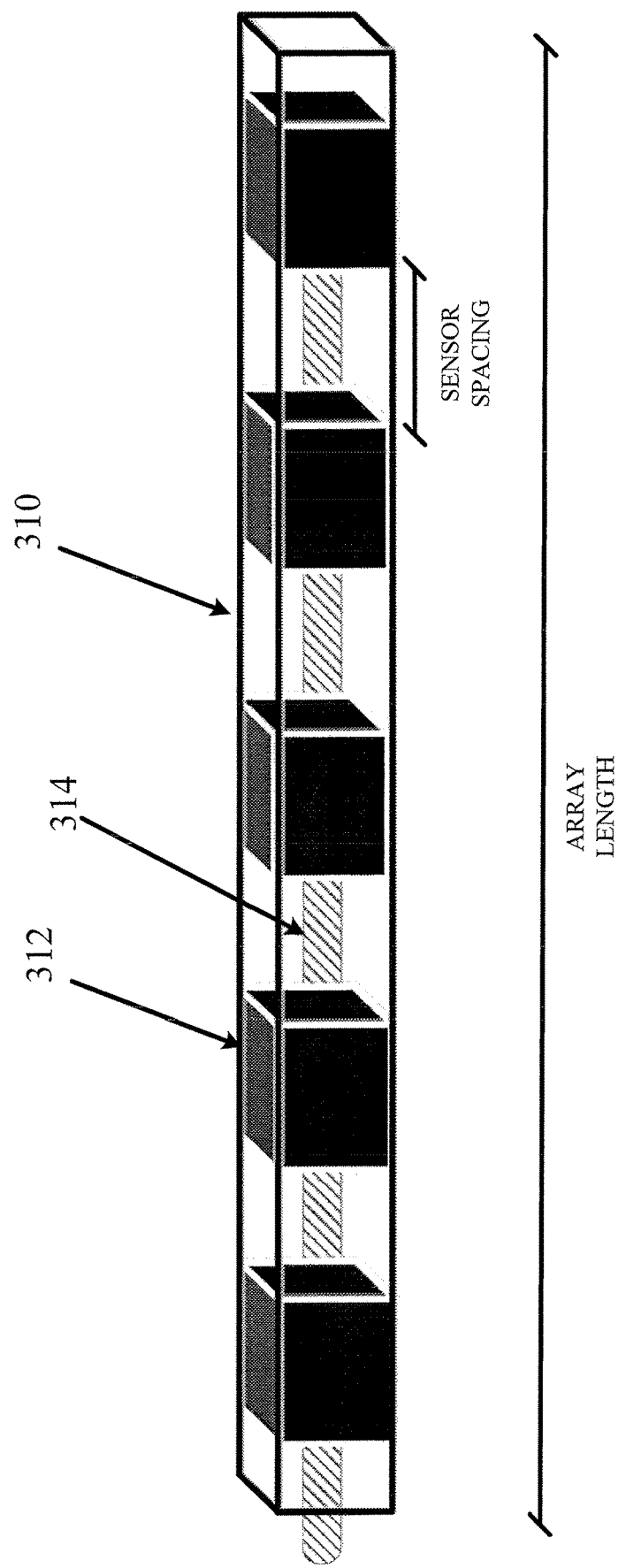
FIG. 3B is a perspective view of the sensor array, according to an embodiment of the disclosure.

An example of the sensor array within cube-like sleeve 310 is shown in FIG. 3B. In this example, the sensor array includes 5 sensors 312 spaced equidistant throughout the array length of sleeve 310. Sensors 312 electrically connect to the controller via wire bundle 314 that runs within cube-like sleeve 310. Although only 5 sensors are shown, it is noted that more than 5 sensors may be utilized. It is also noted that the sensors could be spaced apart in at different sensor spacing intervals that do not have to be equidistant. In addition, although not shown, the end of the wire bundle shown on the left of the figure connects to the combine controller.

Figure 3C:
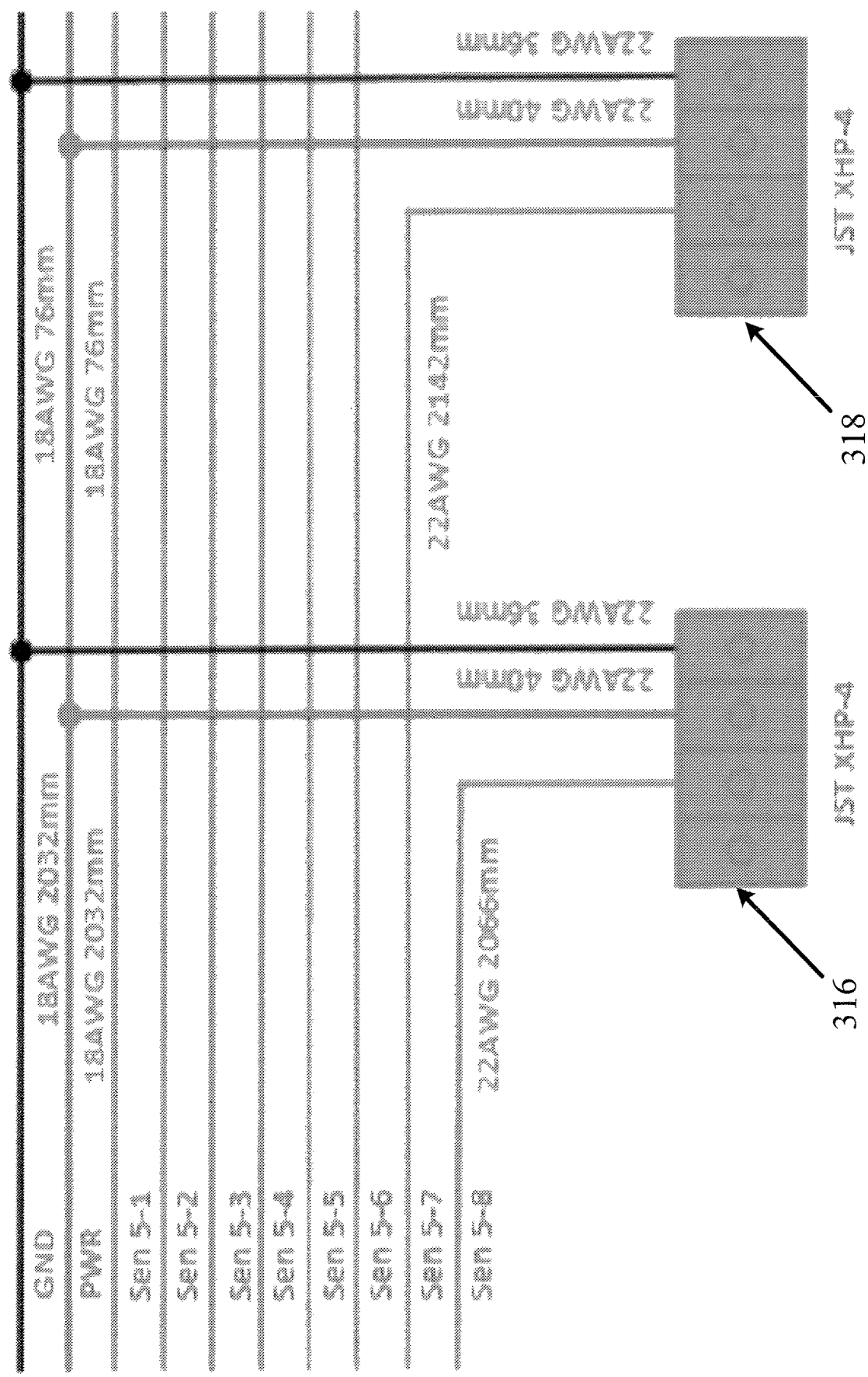
FIG. 3C is a schematic view of the wiring in the sensor array, according to an embodiment of the disclosure.

The electrical connections between the sensors and the combine controller are shown in the schematic diagram of FIG. 3C. Only two sensors 316 and 318 are shown for the sake of clarity. However, it should be noted that the other sensors in the array would be connected in a similar manner.

As shown in FIG. 3C, the wire bundle includes various wires which include, but are not limited to a ground wire GND, a power wire PWR, and data wires 5-1 to 5-8. In this example, there are 8 data wires to accommodate 8 sensors in the array. In this example, all of the sensors, including sensors 316 and 318 shown connect to the GND and the PWR wires in the wire bundle. These connections provide the sensors with the electrical power required to drive the components in the sensor circuit. Although each sensor shares the same GND and PWR wires, each sensor has a unique data wire. In this example, sensor 316 is the eighth sensor in the array and therefore connects to data wire 5-8. Likewise, sensor 318 is the seventh sensor in the array and therefore connects to data wire 5-7. These data wires allow trigger signals to be transmitted from the sensors to the controller (not shown) which is also connected to data wires 5-1 to 5-8. In an alternative example, all of the sensors could share a common data wire configured as a data bus with scheduled transmissions.

During operation, the GND and PWR wires power all of the sensors including sensors 316 and 318 shown. The electric circuit uses this power to emit an IR signal. When no grain is present, the IR receiver does not receive a reflection, and therefore the signal on data wires 5-1 to 5-8 remains at a predetermined logic state (e.g. logic 0). However, when grain is present at sensor 316, the IR receiver does receive a reflection (i.e., the grain reflects the IR beam), and therefore the signal on data wire 5-8 changes its logic state (e.g. logic 1). The controller is therefore able to determine that the grain is at the lowest level in the grain tank. As the grain level rises, the grain triggers more sensors to output a logic 1. The number of logic 1's (i.e., triggered sensors) received by the controller indicates the grain level. For example, if 4 out of 8 sensors transmit a logic 1, then the controller determines that the grain tank is half full assuming the sensors are positioned at discrete volume levels within the tank.

FIG. 4 shows an example of a system 400 for controlling the combine. The system 400 includes an interconnection between a control system 410 of combine 10, a remote PC 406 and a remote server 402 through network 404 (e.g. Internet). It should be noted that combine 10 does not have to be connected to other devices through a network. The controller of combine 10 can be a standalone system that receives operating instructions (e.g. tank level instructions such as alert levels) through a user interface, through a removable memory device (e.g. Flash Drive) or from a server 402 via transceiver 417 (e.g. Wi-Fi, Bluetooth, Cellular, etc.).

Prior to operating combine 10, an operator may designate the tank level alerts and other tank level related instructions. In one example, the operator uses interface 411 of the combine control system or PC 406 located at a remote location. Interface 411 and PC 406 allow the operator to view locally stored parameters from memory device 415 and/or download parameters from server 402 through network 404. The operator may select (via Interface 411 or PC 406) appropriate tank level related instructions based on various factors including, among others, the type of crop to be harvested by the combine, and the terrain. Once the tank level related instructions are selected, the operator can begin harvesting. Combine controller 412 then controls actuators 414 (e.g. thresher, chopper, etc.) based on the instructions. For example, sensors 416 (e.g. tank level sensor) may be used during harvesting to more accurately determine the grain level to avoid spillage. GPS receiver 413 produces information to track harvesting and monitor terrain.

Although the grain tank level sensors detect the grain pile at multiple locations within the tank, the grain pile includes a section of grain above the grain level that is undetected by the sensors. This section will now be described.

Figure 5A:
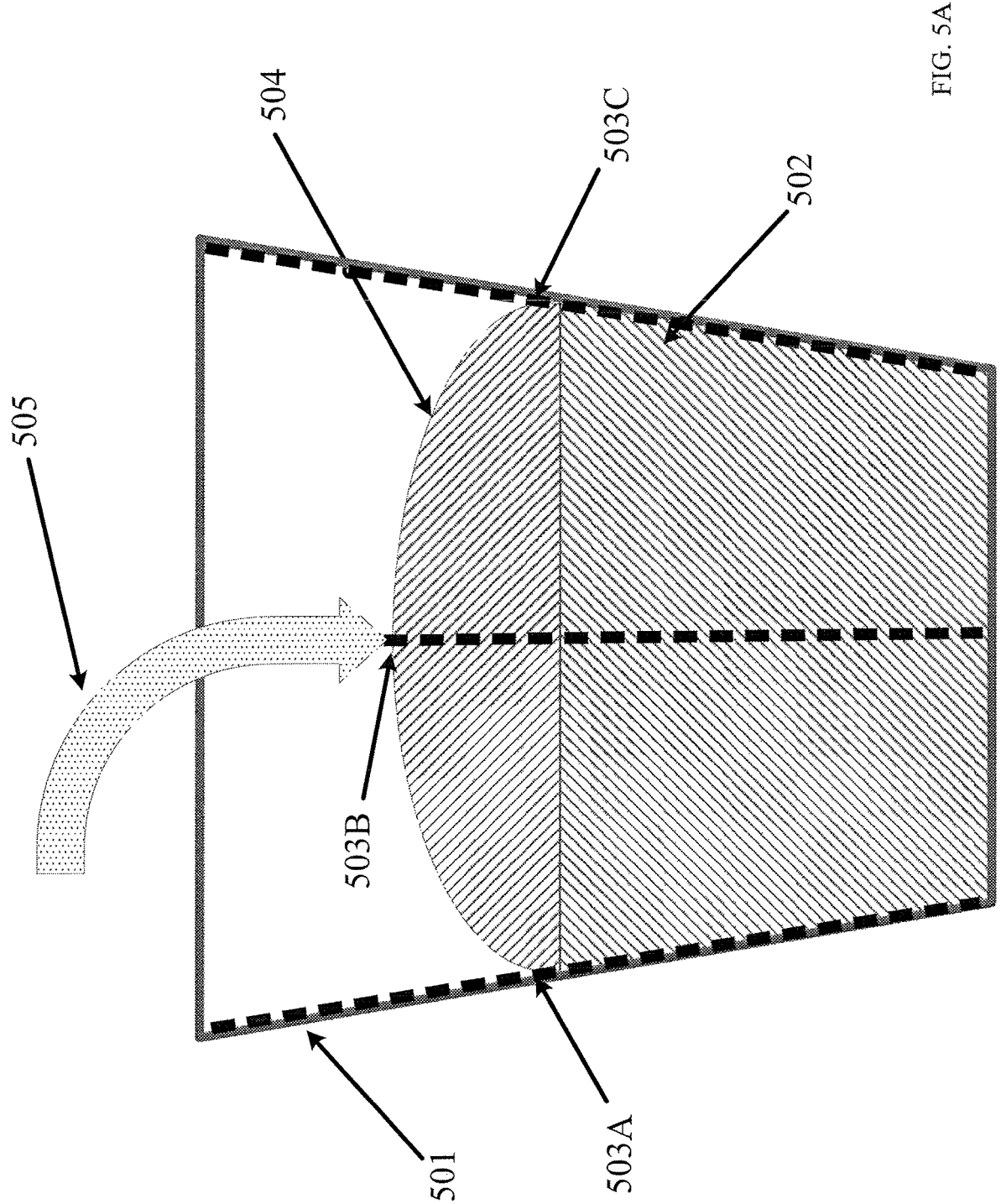
FIG. 5A is a view of the grain base and the grain heap, according to an embodiment of the disclosure.

FIG. 5A shows a simplified view of a grain pile. As the grain elevator pours the grain into tank 501 along path 505, two distinct volumes form. As shown, these two basic volumes include a grain base 502 and a grain heap 504. Grain base 502 is the volume of grain that forms the bottom portion of the grain pile. Grain base 502 touches the sidewalls (and therefore the triggered sensors 503A and 503C) of the grain tank as shown in FIG. 5A. Thus, the grain level is based on the detection of grain base 502. In this example, the grain level based solely on the grain base 502 is 50% of the grain tank volume.

However, it is clear from FIG. 5A, that the grain pile is much higher than indicated by the level of the grain base 502. A portion of the pile known as grain heap 504 sits on top of the grain base and is much closer to the top of the grain tank 501 and more prone to spillage. The grain heap forms due to the manner in which the elevator pours the grain into the grain tank from above, and the friction between the grains. As can be seen in FIG. 5A, the grain heap 504 is not touching the sides of the grain tank, and is therefore only detected by triggered center sensor 503B.

In order to more accurately determine the grain tank level, the volume of the grain heap 504 should be determined. There are multiple methods for determining the volume of the grain heap 504. One such method is to estimate the volume of the grain heap 504 as a known geometric shape (e.g., sphere, cone, etc.) which is a mathematically describable shape.

Figure 5B:
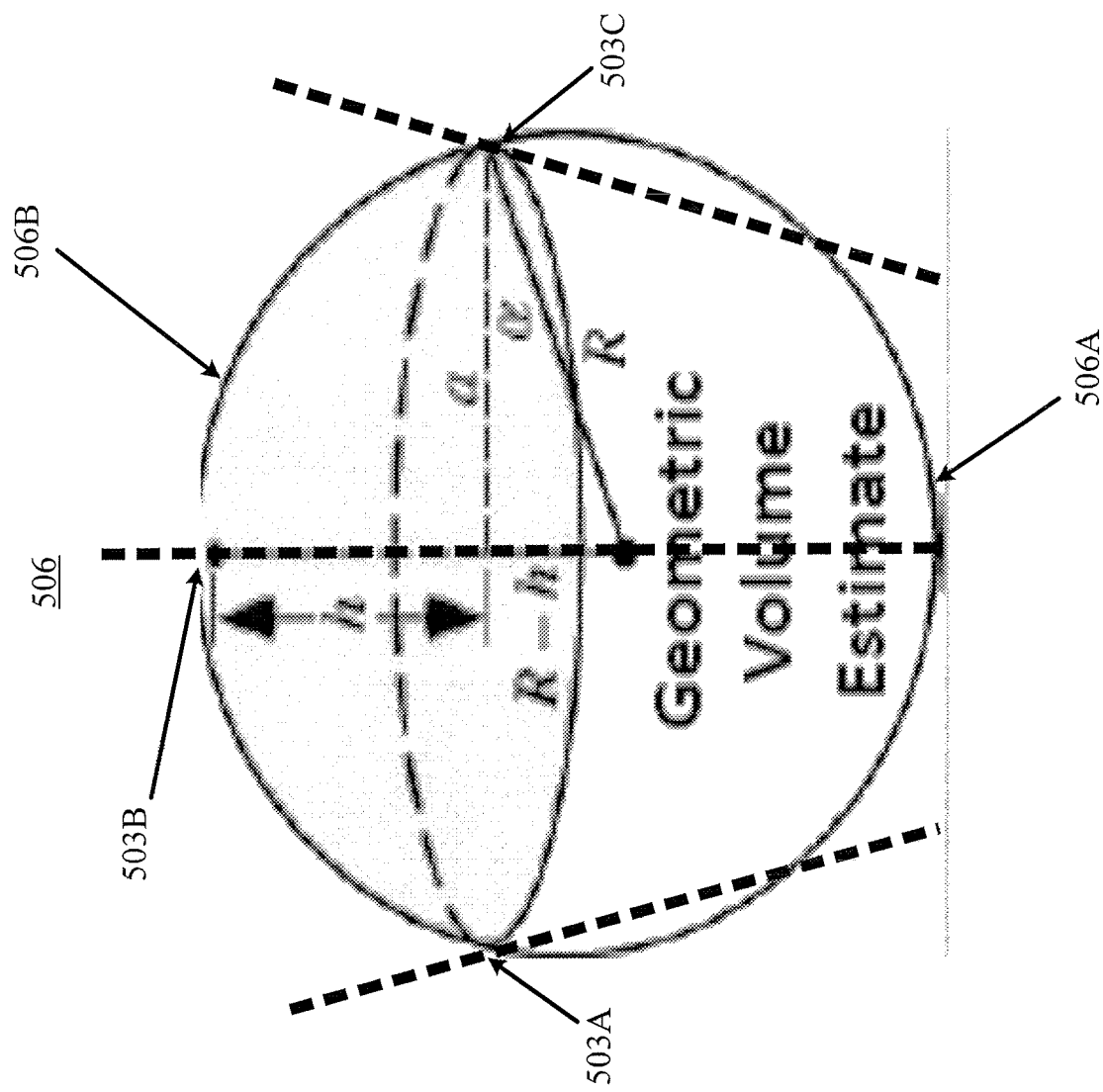
FIG. 5B is a view of a sphere for estimating the grain heap volume, according to an embodiment of the disclosure.

In one example, the volume of the grain heap may be estimated based on a sphere 506 shown in FIG. 5B. The sphere 506 has a bottom portion 506A and a top portion 506B. The sphere 506 also includes a radius R that extends from a center-point. The top portion 506B is a cross-section of the sphere that has a height 'h' that is fraction of radius R and located at an angle of repose d . The grain heap 504 may be estimated by choosing the height 'h' and a radius 'R' of sphere section 506B that best represents the grain heap 504 from FIG. 5A based on various factors including the grain tank level detected by the sensors, the geometry of the grain tank, etc. For example, radius 'R' can be determined based on the horizontal distance between triggered side sensors 503A and 503C, whereas the height 'h' can be determined based on the vertical distance between the side sensors to the triggered center sensor 503B.

Figure 5C:
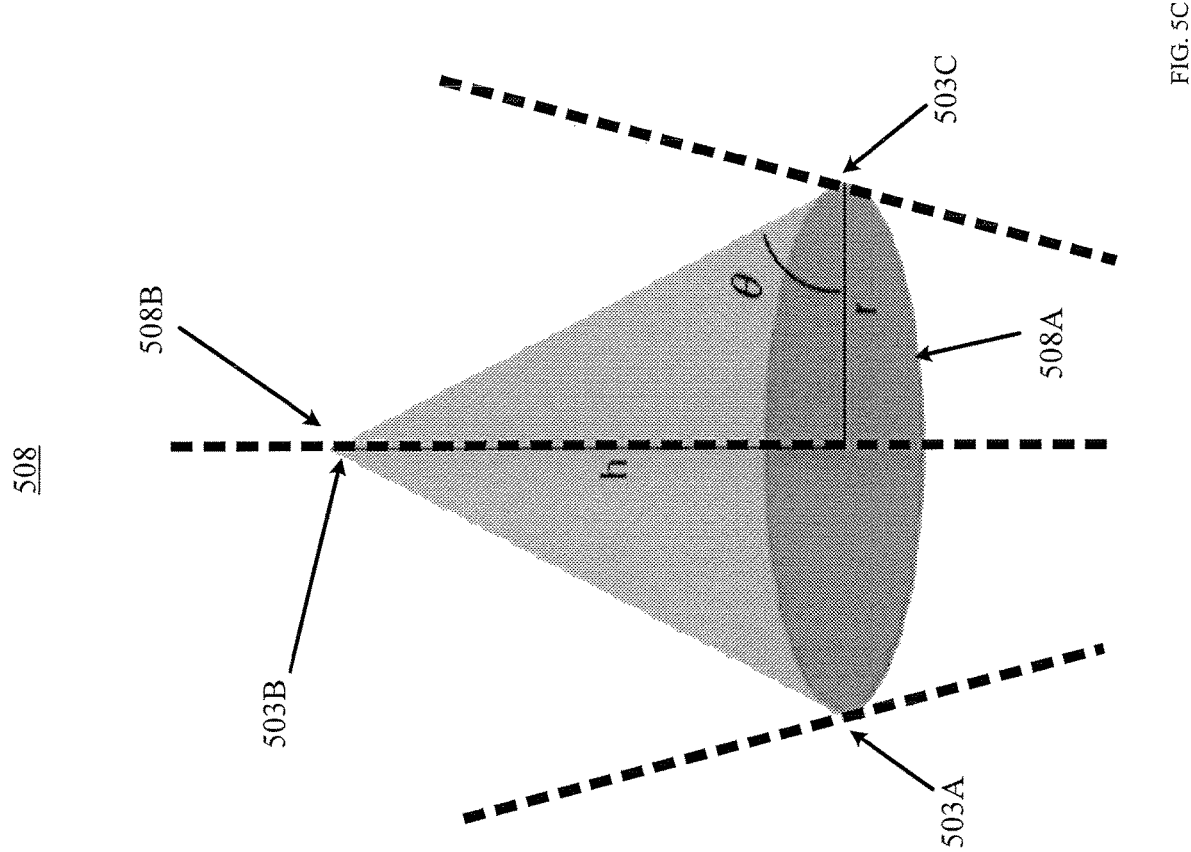
FIG. 5C is a view of a cone for estimating the grain heap volume, according to an embodiment of the disclosure.

In an alternative example, the volume of the grain heap 504 may be estimated based on a cone 508 as shown in FIG. 5C. The cone in FIG. 5C has a radius 'r' that extends from a center-point, and a height 'h' that extends from the base 508A to the peak 508B. Similar to the sphere example, the grain heap 504 may be estimated by choosing the height 'h' and a radius 'r' of the cone that best represents the grain heap 504 based on various factors including the grain tank level detected by the sensors, the geometry of the grain tank, etc. For example, radius 'r' can be determined based on the horizontal distance between triggered side sensors 503A and 503C, whereas the height 'h' can be determined based on the vertical distance between the side sensors to the triggered center sensor 503B.

Known geometrical shapes are not necessary for estimating the volume of the grain heap 504. For example, another method for estimating the volume of the grain heap could be based on a complex 3-dimensional shape from the grain tank levels. An example of such a complex mathematically describable shape is shown in FIGS. 5D-5G. In this example, the controller may be configured to determine a volume of the grain heap 504 by estimating a plane of best fit representing the top of the grain base (e.g. the top surface of grain base 502). This plane of best fit may be based on the detected levels within the grain tank.

For example, the system may include sensor arrays positioned in the center region of the grain tank, and sensor arrays positioned at locations than near the walls of the tank. The information from the side wall sensor arrays and the center sensor arrays provides data to draw a best-fit surface through triggered sensors from the wall arrays and center arrays. This may be accomplished by way of a surface-fitting function. In this way, a non-geometric shaped grain heap surface can be described mathematically by a set of point coordinates that are greater in number than the number of sensor arrays, that when connected with triangular facets, create an irregular surface that closely matches the true grain heap surface. Since the surface described by the fitting function may not have clear boundaries, a polygon created by connecting wall array sensors that lie on the base plane (referred to as the grain heap base) can be projected vertically to create an outside boundary enclosing the portion of the best-fit surface that represents the grain heap. The volume enclosed between the remaining enclosed best-fit surface section and the base plane represents that heap volume.

Figure 5D:
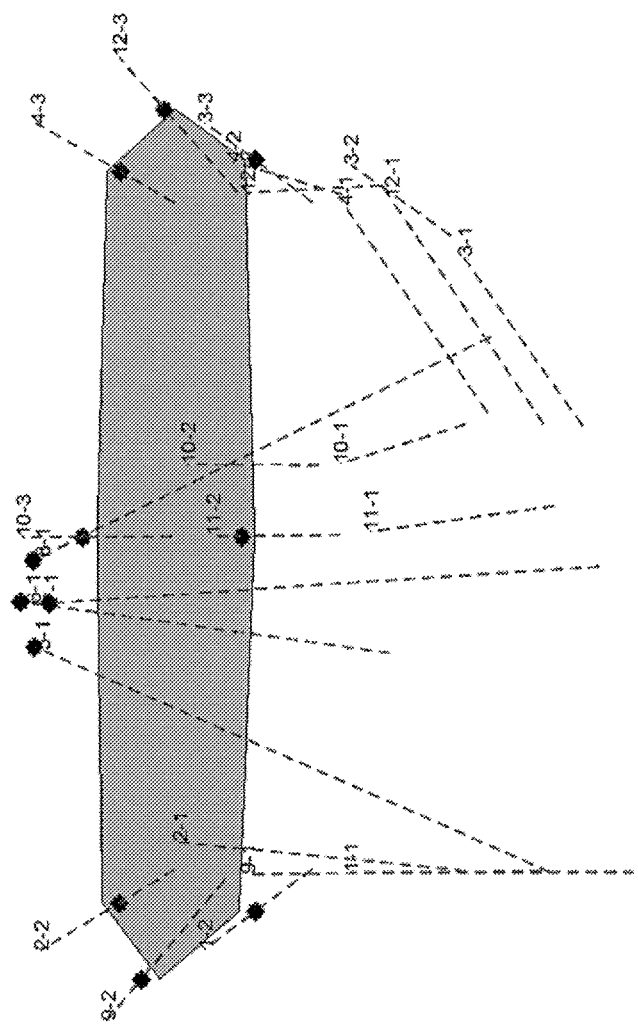
FIG. 5D is a 3-dimensional view of the grain base detected by triggered sensors, according to an embodiment of the disclosure.
Figure 5E:
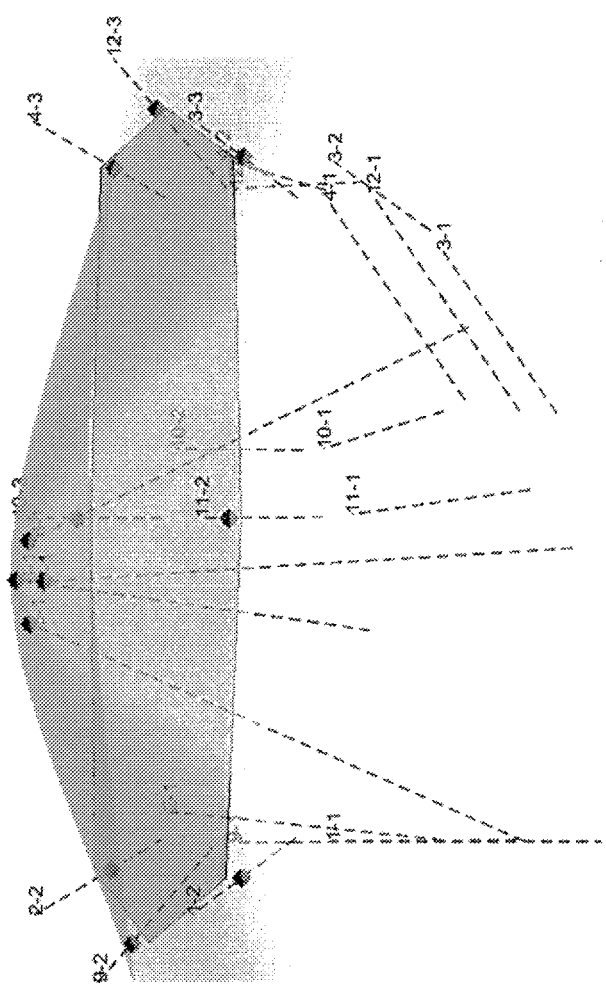
FIG. 5E is a 3-dimensional view of a best fit surface drawn through the triggered sensors, according to an embodiment of the disclosure.
Figure 5F:
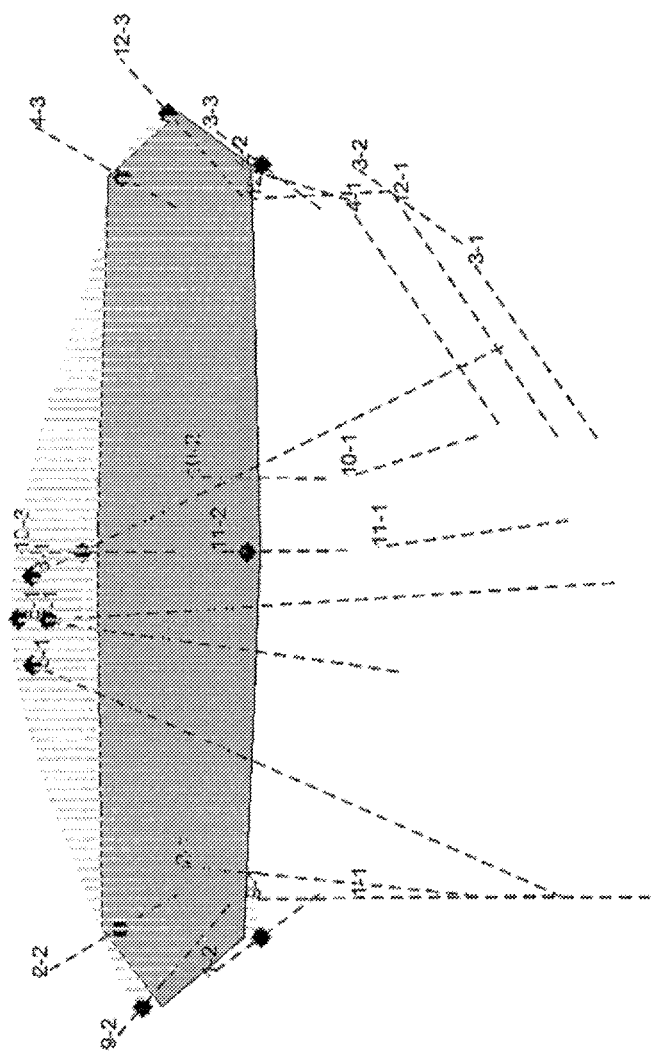
FIG. 5F is a 3-dimensional view of a section of best fit surface enclosed by vertical projection of base vertices, according to an embodiment of the disclosure.
Figure 5G:
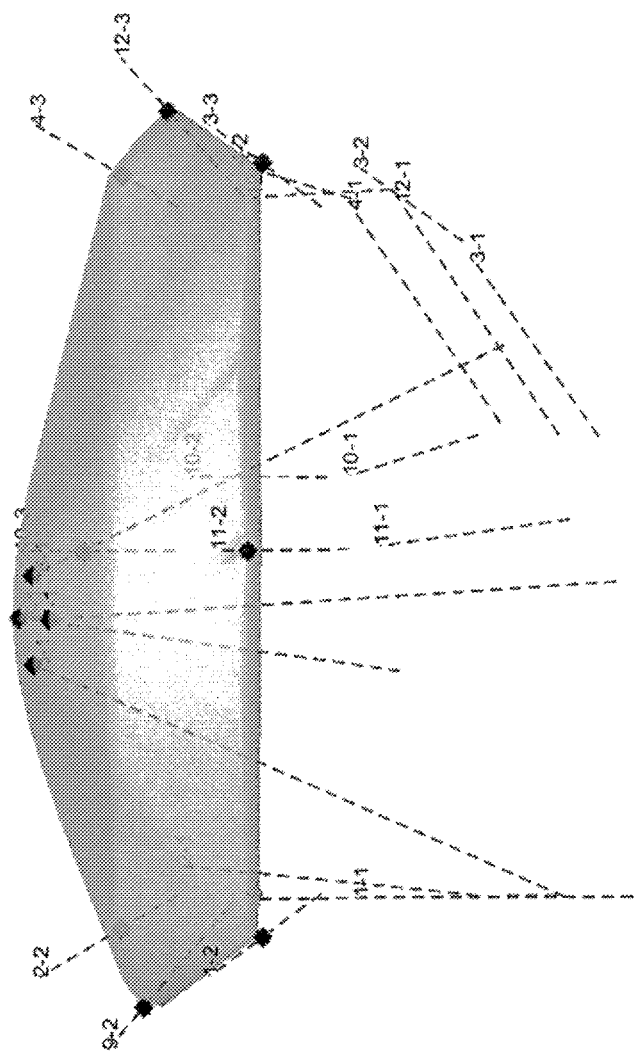
FIG. 5G is a 3-dimensional view of an estimated grain heap volume based on a plane of best fit, according to an embodiment of the disclosure.

This process is illustrated in FIGS. 5D-5G. For example, FIG. 5D shows a 3-dimensional view of the grain base detected by triggered sensors (black dots) in the side arrays (8 dashed lines) and center arrays (4 dashed lines). FIG. 5E shows a 3-dimensional view of a best fit surface drawn through the triggered sensors and superimposed over the grain base from FIG. 5D. FIG. 5F shows a 3-dimensional view of a section of best fit surface enclosed by vertical projection of base vertices extending from the bottom of the grain base to the top surface of the heap. FIG. 5G shows a 3-dimensional view of an estimated grain heap volume based on the plane of best fit in FIG. 5F.

Regardless of the method used to determine the volume of the undetected grain heap 504, the controller is able to determine the total volume of grain in the grain tank by combining the volume of the grain heap with the volume of the grain base. This may be used to keep track of the amount of grain in the tank, and determine if an alarm should be sounded to avoid spillage.

Figure 6A:
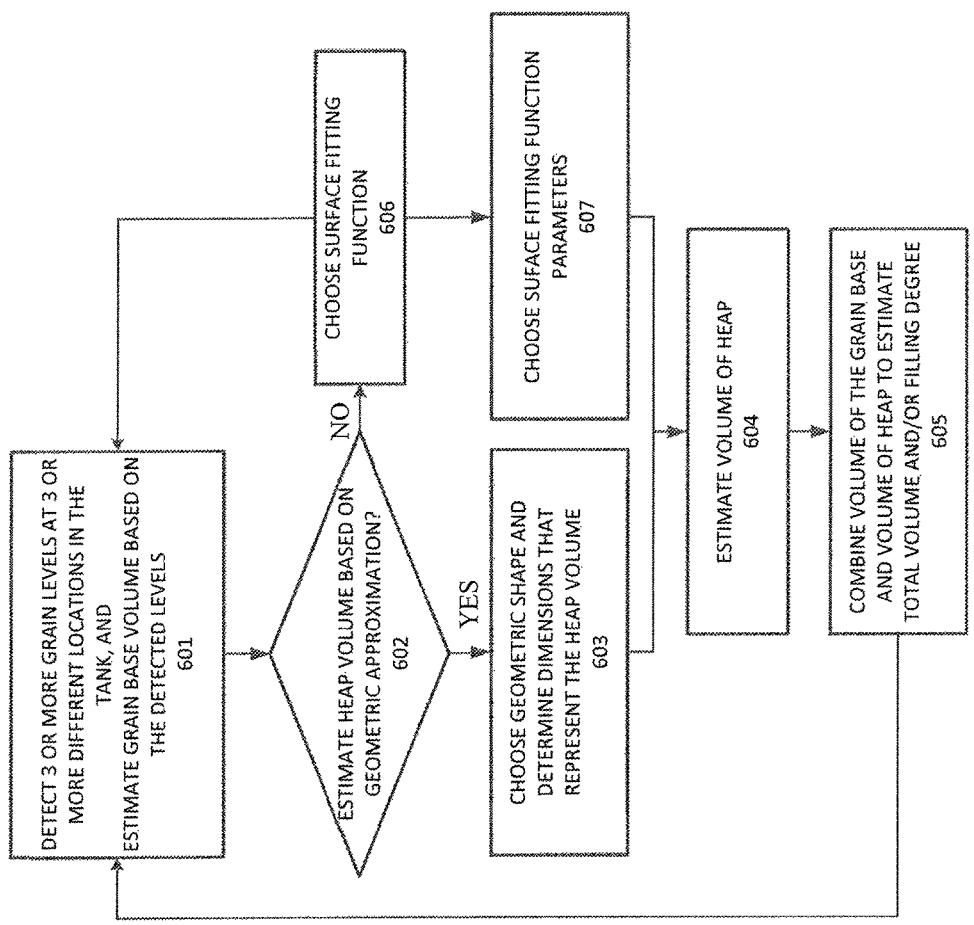
FIG. 6A is a flowchart for estimating the grain tank volume and grain heap volume, according to an embodiment of the disclosure.

FIG. 6A is a flowchart 600 for estimating the grain tank level and the grain heap volume. In step 601, the controller receives signals from the sensor array indicating grain levels at 3 or more locations (e.g. two side locations and one center location) in the grain tank. The controller uses this information to determine the volume of the grain base. In step 602, the controller determines if the estimate of the grain heap is to be performed by geometric approximation or not. If geometric approximation is to be used, the controller chooses a geometric shape to represent the grain heap in step 603, estimates the volume of the grain heap in step 604 by using a surface fitting method to mathematically approximate the grain heap surface as the selected geometric shape, and combines to volume of the grain base and grain heap to determine the total grain volume in the tank. If geometric approximation is not used, the controller chooses a surface fitting function in step 606, sets surface fitting function parameters in step 607, estimates the volume of the grain heap in step 604 by projecting vertices of a polygon from the surface of the base, and combines the volume of the grain base and grain heap to determine the total volume in the tank.

Figure 6B:
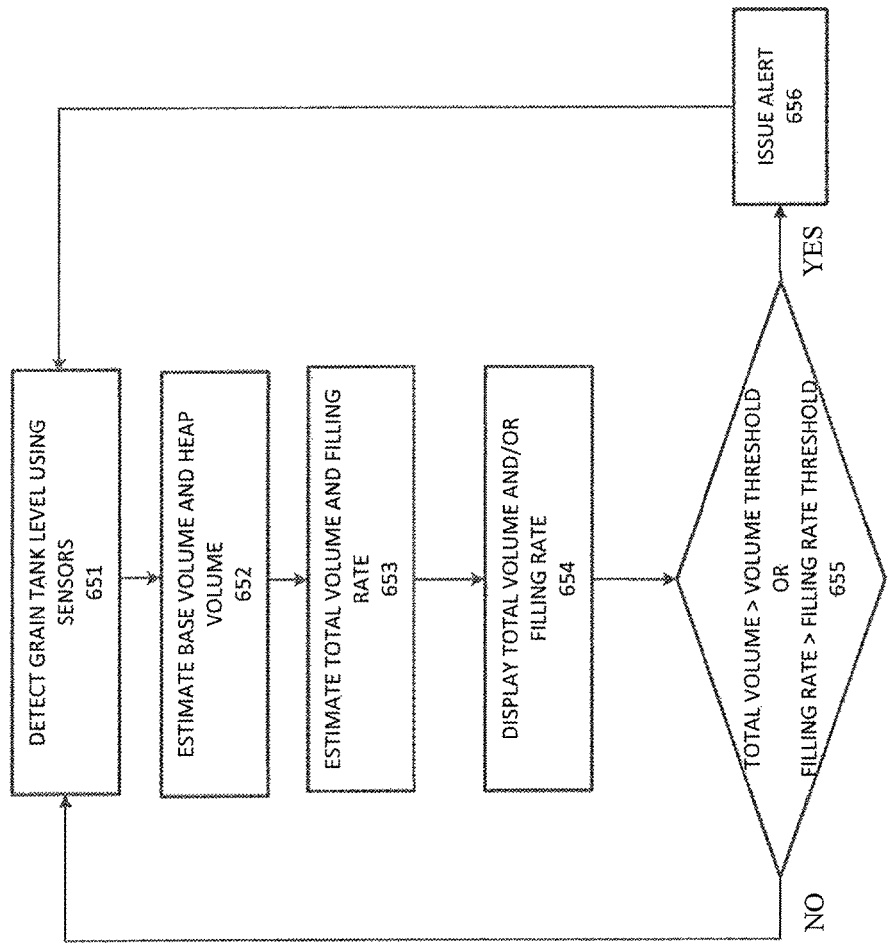
FIG. 6B is a flowchart for controlling the combine based on the estimated the grain tank volume and grain heap volume, according to an embodiment of the disclosure.

Once the total volume of the grain tank is determined, the controller and/or operator controls the combine accordingly. For example, FIG. 6B is a flowchart 650 for controlling the combine based on the estimated volumes. The controller determines the grain tank level using sensors in step 651, estimates grain base volume and grain heap volume in step 652, estimates total volume (e.g. number of bushels) and filling rate (e.g. % full) in step 653, and displays total volume and/or filling rate in step 654. The controller then compares the volume and/or filling rate to respective thresholds in step 655. If either value is greater than the threshold, then the controller issues an alert to the driver in step 656. The alert lets the driver know that a specific volume has been reached, or that spillage may occur.

The controller may output various metrics to represent the grain volume and/or filling rate. These metrics may include the number of bushels of grain in the tank, the percentage of grain tank that is full, etc. The thresholds may be set based on volume and/or based on the percentage of grain tank that is full. In addition, the controller may display these metrics as numbers on the combine display screen, or as a graphic similar to FIG. 5A that shows the operator the state of the grain tank.

The steps of estimating the grain tank level in FIGS. 6A and 6B are performed by control system 410 including controller 412 upon loading and executing software code or instructions which are tangibly stored on a tangible computer readable medium 415, such as on a magnetic medium, e.g., a computer hard drive, an optical medium, e.g., an optical disc, solid-state memory, e.g., flash memory, or other storage media known in the art. Thus, any of the functionality performed by the controller 412 described herein, such as the steps shown in FIGS. 6A and 6B, are implemented in software code or instructions which are tangibly stored on a tangible computer readable medium. Upon loading and executing such software code or instructions by the controller 412, the controller 412 may perform any of the functionality of the controller 412 described herein, including the steps shown in FIGS. 6A and 6B described herein.

The term "software code" or "code" used herein refers to any instructions or set of instructions that influence the operation of a computer or controller 412. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a feeder housing for receiving harvested crop;
   a separating system for threshing the harvested crop to separate grain from residue;
   a grain tank for storing the separated grain;
   a grain tank level sensor for detecting a level of grain in the grain tank; and
   a controller that controls the combine, the controller configured to:
      receive the level of grain from the grain tank level sensor,
      determine a volume of a grain base from the level of the grain,
      determine a volume of a grain heap above the grain base, and
      determine a total volume by combining the volume of the grain base with the volume of the grain heap.

2. The combine of claim 1,
   wherein the controller is further configured to determine the volume of the grain heap based on a mathematically describable shape.

3. The combine of claim 1,
   wherein the controller is further configured to determine the volume of a grain base below the grain heap based on a geometry of the grain tank.

4. The combine of claim 3,
   wherein the controller is further configured to determine a volume of the grain heap by estimating a plane of best fit representing the grain base, and using a plurality of grain tank level sensors, a best-fit surface is determined with a boundary identified as a vertical projection of base vertices, a volume enclosed between the section of best-fit surface and the base represents the volume of the grain heap.

5. The combine of claim 4,
   wherein the controller is further configured to determine the total volume of grain in the grain tank by superimposing the volume of the grain heap on top of the volume of the grain base.

6. The combine of claim 5,
   wherein the controller is further configured to determine a filling degree of the grain tank based on the grain tank level sensor data, the filling degree indicates how the grain tank is being filled by the grain.

7. The combine of claim 6,
   wherein the controller is further configured to compare the filling degree to a filling degree threshold, and issue a warning when the filling degree exceeds the filling degree threshold, or
   wherein the controller is further configured to compare the total volume of the grain to a volume threshold, and issue a warning when the total volume of the grain exceeds the volume threshold.

8. The combine of claim 1,
   wherein the grain tank level sensor includes at least three grain tank level sensors positioned around the grain tank.

9. The combine of claim 8,
   wherein the grain tank level sensors each include an array of sensors configured to detect grain in a region local to the array, each extending from a bottom portion of the grain tank to an upper portion of the grain tank.

10. The combine of claim 9,
    wherein sensors in each array include at least one of optical sensors or pressure sensors.

11. A method for controlling a combine including a chassis, a feeder housing for receiving harvested crop, a separating system for threshing the harvested crop to separate grain from residue, a grain tank for storing the separated grain, a grain tank level sensor for detecting a level of grain in the grain tank, and a controller that controls the combine, the method comprising:
    receiving, by the controller, the level of grain from the grain tank level sensor,
    determining, by the controller, a volume of a grain base from the level of the grain,
    determining, by the controller, a volume of a grain heap above the grain base, and
    determining, by the controller, a total volume by combining the volume of the grain base with the volume of the grain heap.

12. The method of claim 11, further comprising:
    determining, by the controller, the volume of the grain heap based on a known geometric shape.

13. The method of claim 11, further comprising:
determining, by the controller, a volume of a grain base below the grain heap.

14. The method of claim 13, further comprising:
determining, by the controller, a volume of the grain heap by estimating a plane of best fit representing a base of the grain heap, and, using a plurality of grain tank level sensors, a best-fit surface is determined with a boundary identified as a vertical projection of base vertices, the volume enclosed between a section of best-fit surface and the base represents the volume of the grain heap.

15. The method of claim 14, further comprising:
determining, by the controller, a total volume of grain in the grain tank by superimposing the volume of the grain heap on top of the volume of the grain base.

16. The method of claim 15, further comprising:
determining, by the controller, a filling degree of the grain tank based on the grain tank level sensor data, the filling degree indicates how the grain tank is being filled by the grain.

17. The method of claim 16, further comprising:
comparing, by the controller, the filling degree to a filling degree threshold, and issue a warning when the filling degree exceeds the filling degree threshold, or
comparing, by the controller, the total volume of the grain to a volume threshold, and issue a warning when the total volume of the grain exceeds the volume threshold.

18. The method of claim 11, further comprising:
wherein the grain tank level sensor includes at least three grain tank level sensors positioned around the grain tank equidistant from one another for detecting the level of grain at least three positions in the grain tank.

19. The method of claim 18,
wherein the grain tank level sensors each include an array of sensors configured to detect the presence of grain in a region local to the array, each extending from a bottom portion of the grain tank to an upper portion of the grain tank.

20. The method of claim 19,
wherein sensors in each array include at least one of optical sensors or pressure sensors.

\* \* \* \* \*